(12) United States Patent
Shou et al.

(10) Patent No.: US 12,499,326 B2
(45) Date of Patent: Dec. 16, 2025

(54) MULTI-MODEL JOINT DENOISING TRAINING

(71) Applicant: Microsoft Technology Licensing, LLC, Redmond, WA (US)

(72) Inventors: Linjun Shou, Beijing (CN); Ming Gong, Beijing (CN); Xuanyu Bai, Beijing (CN); Xuguang Wang, Beijing (CN); Daxin Jiang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 219 days.

(21) Appl. No.: 18/278,364

(22) PCT Filed: Mar. 8, 2022

(86) PCT No.: PCT/US2022/019217
§ 371 (c)(1),
(2) Date: Aug. 22, 2023

(87) PCT Pub. No.: WO2022/211984
PCT Pub. Date: Oct. 6, 2022

(65) Prior Publication Data
US 2024/0184997 A1 Jun. 6, 2024

(30) Foreign Application Priority Data
Mar. 30, 2021 (CN) .......................... 202110338761.8

(51) Int. Cl.
*G06F 40/44* (2020.01)
*G06F 40/284* (2020.01)

(52) U.S. Cl.
CPC ............ *G06F 40/44* (2020.01); *G06F 40/284* (2020.01)

(58) Field of Classification Search
None
See application file for complete search history.

(56) References Cited

U.S. PATENT DOCUMENTS

| 2019/0043516 | A1 | 2/2019 | Germain |
| 2020/0074997 | A1* | 3/2020 | Jankowski, Jr. ........ G06N 3/045 |
| 2020/0226212 | A1 | 7/2020 | Tan |
| 2020/0311599 | A1 | 10/2020 | Chen |

(Continued)

FOREIGN PATENT DOCUMENTS

| CN | 109784391 A | 5/2019 |
| CN | 110276248 A | 9/2019 |
| CN | 110598224 A | 12/2019 |

(Continued)

OTHER PUBLICATIONS

Office Action Received for Chinese Application No. 202110338761.8, mailed on Sep. 12, 2024, 17 pages (English Translation Provided).

(Continued)

*Primary Examiner* — Antim G Shah
(74) *Attorney, Agent, or Firm* — Schwegman Lundberg & Woessner, P.A.

(57) ABSTRACT

The present disclosure proposes a method and apparatus for multi-model joint denoising training. Multiple models may be obtained. A set of training samples may be denoised through the multiple models. The multiple models may be trained with the set of denoised training samples.

15 Claims, 6 Drawing Sheets

(56) References Cited

U.S. PATENT DOCUMENTS

2020/0334539 A1  10/2020  Wang

FOREIGN PATENT DOCUMENTS

| CN | 111340233 A | 6/2020 |
| --- | --- | --- |
| CN | 111859994 A | 10/2020 |
| WO | 2004036546 A1 | 4/2004 |

OTHER PUBLICATIONS

Notice of Grant Received for Chinese Application No. 202110338761.8, mailed on Feb. 19, 2024, 4 pages (English Translation Provided).

Third Office Action Received for Chinese Application No. 202110338761.8, mailed on Nov. 25, 2024, 14 pages (English Translation Provided).

Zhao, et al., "Data Augmentation with Atomic Templates for Spoken Language Understanding", In Proceedings of the Conference on Empirical Methods in Natural Language Processing and the 9th International Joint Conference on Natural Language Processing, Nov. 3, 2019, pp. 3637-3643.

Zoph, et al., "Rethinking Pre-training and Self-training", In Repository of arXiv:2006.06882v1, Jun. 11, 2020, pp. 1-16.

Office Action Received for Chinese Application No. 202110338761.8, mailed on Apr. 26, 2024, 19 pages (English Translation Provided).

Anaby-Tavor, et al., "Do Not Have Enough Data? Deep Learning to the Rescue!", In the Proceedings of the Thirty-Fourth AAAI Conference on Artificial Intelligence, Feb. 7, 2020, pp. 7383-7390.

Bari, et al., "XLA: A Robust Unsupervised Data Augmentation Framework for Cross-Lingual NLP", In Proceedings of The International Conference on Learning Representations, May 4, 2021, pp. 1-29.

Bian, et al., "Learning to Match Jobs with Resumes from Sparse Interaction Data using Multi-View Co-Teaching Network", In Proceedings of the 29th ACM International Conference on Information & Knowledge Management, Oct. 19, 2020, pp. 65-74.

Conneau, et al., "Cross-lingual Language Model Pretraining", In Proceedings of the 33rd International Conference on Neural Information Processing Systems, Dec. 8, 2019, pp. 1-11.

Conneau, et al., "Unsupervised Cross-lingual Representation Learning at Scale", In Proceedings of the 58th Annual Meeting of the Association for Computational Linguistics, Jul. 5, 2020, pp. 8440-8451.

Devlin, et al., "BERT: Pre-training of Deep Bidirectional Transformers for Language Understanding", In Proceedings of the 2019 Conference of the North American Chapter of the Association for Computational Linguistics: Human Language Technologies, vol. 1, Jun. 2, 2019, pp. 4171-4186.

Doersch, Carl, "Tutorial on variational autoencoders", In Repository of arXiv:1606.05908v1, Jun. 19, 2016, pp. 1-22.

Dyer, et al., "A Simple, Fast, and Effective Reparameterization of IBM Model 2", In Proceedings of the Conference of the North American Chapter of the Association for Computational Linguistics: Human Language Technologies, Jun. 9, 2013, pp. 644-648.

Einolghozati, et al., "El Volumen Louder Por Favor: Code-switching in Task-oriented Semantic Parsing", In Repository of arXiv.2101.10524v2, Jan. 27, 2021, 13 Pages.

Fan, et al., "Hierarchical Neural Story Generation", In Proceedings of the 56th Annual Meeting of the Association for Computational Linguistics, Jul. 15, 2018, pp. 889-898.

Gao, et al., "Paraphrase Augmented Task-Oriented Dialog Generation", In Repository of arXiv:2004.07462v1, Apr. 16, 2020, 10 Pages.

Goodfellow, et al., "Generative Adversarial Networks", In the Journal of Communications of the ACM, vol. 63, Issue 11, Nov. 2020, pp. 139-144.

Guo, et al., "Learning from Multiple Noisy Augmented Data Sets for Better Cross-Lingual Spoken Language Understanding", In Repository of arXiv:2109.01583v1, Sep. 3, 2021, 12 Pages.

Han, et al., "Co-teaching: Robust Training of Deep Neural Networks with Extremely Noisy Labels", In Proceedings of the 32nd International Conference on Neural Information Processing Systems, Dec. 3, 2018, pp. 1-11.

Huang, et al., "Federated Learning for Spoken Language Understanding", In Proceedings of the 28th International Conference on Computational Linguistics, Dec. 8, 2020, pp. 3467-3478.

Huang, et al., "Unicoder: A Universal Language Encoder by Pre-training with Multiple Cross-lingual Tasks", In Proceedings of the Conference on Empirical Methods in Natural Language Processing and the 9th International Joint Conference on Natural Language Processing, Nov. 3, 2019, pp. 2485-2494.

Kumar, et al., "Data Augmentation Using Pre-trained Transformer Models", In Repository of arXiv:2003.02245v1, Mar. 4, 2020, 8 Pages.

Lample, et al., "Unsupervised Machine Translation Using Monolingual Corpora Only", In Repository of arXiv:1711.00043v1, Oct. 31, 2017, pp. 1-12.

Li, et al., "DivideMix: Learning with Noisy Labels as Semi-supervised Learning", In Repository of arXiv:2002.07394v1, Feb. 18, 2020, pp. 1-14.

Li, et al., "MTOP: A Comprehensive Multilingual Task-Oriented Semantic Parsing Benchmark", In Repository of arXiv:2008.09335v1, Aug. 21, 2020, 10 Pages.

Li, et al., "Unsupervised Cross-lingual Adaptation for Sequence Tagging and Beyond", In Repository of arXiv:2010.12405v1, Oct. 23, 2020, 14 Pages.

Liu, et al., "Attention-Based Recurrent Neural Network Models for Joint Intent Detection and Slot Filling", In Proceedings of the Interspeech, Sep. 8, 2016, pp. 685-689.

Liu, et al., "Attention-Informed Mixed-Language Training for Zero-Shot Cross-Lingual Task-Oriented Dialogue Systems", In Proceedings of the Thirty-Fourth AAAI Conference on Artificial Intelligence, Feb. 7, 2020, pp. 8433-8440.

Liu, et al., "Butterfly: One-step Approach towards Wildly Unsupervised Domain Adaptation", In Repository of arXiv:1905.07720v3, Feb. 18, 2021, pp. 1-23.

Liu, et al., "Cross-lingual Spoken Language Understanding with Regularized Representation Alignment", In Proceedings of the Conference on Empirical Methods in Natural Language Processing, Nov. 16, 2020, pp. 7241-7251.

Liu, et al., "Multilingual Denoising Pre-training for Neural Machine Translation", In Journal of Transactions of the Association for Computational Linguistics, vol. 8, Jan. 24, 2020, pp. 726-742.

Liu, et al., "Unsupervised Anomaly Detection by Robust Collaborative Autoencoders", In Proceedings of The International Conference on Learning Representations, May 4, 2021, 19 Pages.

Liu, et al., "Zero-shot Cross-lingual Dialogue Systems with Transferable Latent Variables", In Proceedings of the Conference on Empirical Methods in Natural Language Processing and the 9th International Joint Conference on Natural Language Processing, Nov. 3, 2019, pp. 1297-1303.

Loshchilov, et al., "Decoupled Weight Decay Regularization", In Proceedings of the 7th International Conference on Learning Representations, May 6, 2019, 18 Pages.

Marivate, et al., "Improving Short Text Classification Through Global Augmentation Methods", In Proceedings of Machine Learning and Knowledge Extraction: 4th IFIP TC 5, TC 12, WG 8.4, WG 8.9, WG 12.9 International Cross-Domain Conference, Aug. 18, 2020, pp. 385-399.

Mccann, et al., "Learned in Translation: Contextualized Word Vectors", In Proceedings of the 31st Conference on Neural Information Processing Systems, Dec. 4, 2017, pp. 1-12.

Och, et al., "A Systematic Comparison of Various Statistical Alignment Models", In Journal of Computational Linguistics, vol. 29, Issue 1, Mar. 1, 2003, pp. 19-51.

Ott, Myle, "MBART: Multilingual Denoising Pre-training for Neural Machine Translation", Retrieved From: https://github.com/facebookresearch/fairseq/tree/main/examples/mbart, Jan. 29, 2021, 5 Pages.

(56) References Cited

OTHER PUBLICATIONS

"International Search Report and Written Opinion Issued in PCT Application No. PCT/US22/019217", Mailed Date: Jul. 15, 2022, 14 Pages.

Peng, et al., "Data Augmentation for Spoken Language Understanding via Pretrained Language Models", In Repository of arXiv:2004.13952v1, Apr. 29, 2020, 6 Pages.

Qin, et al., "CoSDA-ML: Multi-Lingual Code-Switching Data Augmentation for Zero-Shot Cross-Lingual NLP", In Proceedings of the Twenty-Ninth International Joint Conference on Artificial Intelligence, 2020, pp. 3853-3860.

Ramshaw, et al., "Text Chunking Using Transformation-Based Learning", In Book of Natural Language Processing Using Very Large Corpora, 1999, pp. 157-176.

Ruder, et al., "A Survey of Cross-lingual Word Embedding Models", In Journal of Artificial Intelligence Research, vol. 65, Aug. 12, 2019, pp. 569-630.

Russo, et al., "Control, Generate, Augment: A Scalable Framework for Multi-Attribute Text Generation", In Proceedings of the Conference on Empirical Methods in Natural Language Processing (EMNLP), Nov. 16, 2020, pp. 351-366.

Schuster, et al., "Cross-lingual Transfer Learning for Multilingual Task Oriented Dialog", In Proceedings of the Conference of the North American Chapter of the Association for Computational Linguistics: Human Language Technologies (NAACL-HLT), Jun. 2, 2019, pp. 3795-3805.

Shakeri, et al., "Multilingual Synthetic Question and Answer Generation for Cross-Lingual Reading Comprehension", In Repository of arXiv:2010.12008v1, Oct. 22, 2020, 7 Pages.

Tanaka, et al., "Data Augmentation Using GANs", In Repository of arXiv:1904.09135v1, Apr. 19, 2019, pp. 1-16.

Tur, et al., "Spoken Language Understanding: Systems for Extracting Semantic Information from Speech", In Book Spoken Language Understanding: Systems for Extracting Semantic Information from Speech, John Wiley And Sons Ltd. Publication, Mar. 2011, 484 Pages.

Upadhyay, et al., "(Almost) Zero-Shot Cross-Lingual Spoken Language Understanding", In Proceedings of the IEEE International Conference on Acoustics, Speech and Signal Processing (ICASSP), Apr. 15, 2018, pp. 6034-6038.

Wang, et al., "Spoken Language Understanding", In Journal of IEEE Signal Processing Magazine, vol. 22, Issue 5, Sep. 26, 2005, pp. 16-31.

Wang, et al., "That's So Annoying !!!: A Lexical and Frame-Semantic Embedding Based Data Augmentation Approach to Automatic Categorization of Annoying Behaviors using #petpeeve Tweets", In Proceedings of the Conference on Empirical Methods in Natural Language Processing, Sep. 17, 2015, pp. 2557-2563.

Wu, et al., "Beto, Bentz, Becas: The Surprising Cross-Lingual Effectiveness of BERT", In Proceedings of the Conference on Empirical Methods in Natural Language Processing and the 9th International Joint Conference on Natural Language Processing, Nov. 3, 2019, pp. 833-844.

Wu, et al., "Conditional BERT Contextual Augmentation", In Journal of Computational Science, Jun. 8, 2019, pp. 84-95.

Xu, et al., "End-to-End Slot Alignment and Recognition for Cross-Lingual NLU", In Proceedings of the Conference on Empirical Methods in Natural Language Processing, Nov. 16, 2020, pp. 5052-5063.

Yang, et al., "Asymmetric Co-Teaching for Unsupervised Cross Domain Person Re-Identification", In Repository of arXiv:1912.01349v1, Dec. 3, 2019, 9 Pages.

\* cited by examiner

MULTI-MODEL JOINT DENOISING TRAINING

CROSS-REFERENCE TO RELATED APPLICATION

This application is a U.S. National Stage Filing under 35 U.S.C. 371 of International Patent Application Serial No. PCT/US2022/019217, filed Mar. 8, 2022, and published as WO 2022/211984 A1 on Oct. 6, 2022, which claims priority to Chinese Application No. 202110338761.8, filed Mar. 30, 2021, which applications and publication are incorporated herein by reference in their entirety.

BACKGROUND

Natural Language Understanding (NLU) is a technology that uses a natural language to communicate with computers, which aims to enable the computers to understand the natural language and use the natural language to achieve communication between humans and the computers, thereby replacing the humans to perform various tasks related to the natural language, e.g., Spoken Language Understanding (SLU) task, Machine Reading Comprehension (MRC) task, Question Answering (QA) task, etc. A NLU task may be performed through a trained machine learning model. The performance of the machine learning model to perform the NLU task depends on a large amount of reliable training data. For rich-resource languages such as English, there are large-scale human-labeled training data for some NLU tasks. Therefore, these NLU tasks have outstanding performance for the rich-resource languages.

SUMMARY

This Summary is provided to introduce a selection of concepts that are further described below in the Detailed Description. It is not intended to identify key features or essential features of the claimed subject matter, nor is it intended to be used to limit the scope of the claimed subject matter.

Embodiments of the present disclosure propose a method and apparatus for multi-model joint denoising training. Multiple models may be obtained. A set of training samples may be denoised through the multiple models. The multiple models may be trained with the set of denoised training samples.

It should be noted that the above one or more aspects comprise the features hereinafter fully described and particularly pointed out in the claims. The following description and the drawings set forth in detail certain illustrative features of the one or more aspects. These features are only indicative of the various ways in which the principles of various aspects may be employed, and this disclosure is intended to include all such aspects and their equivalents.

BRIEF DESCRIPTION OF THE DRAWINGS

The disclosed aspects will hereinafter be described in conjunction with the appended drawings that are provided to illustrate and not to limit the disclosed aspects.

DETAILED DESCRIPTION

The present disclosure will now be discussed with reference to several exemplary implementations. It is to be understood that these implementations are discussed only for enabling those skilled in the art to better understand and thus implement the embodiments of the present disclosure, rather than suggesting any limitations on the scope of the present disclosure.

It is desired to extend NLU tasks such as a SLU task, a MRC task, a QA task, etc., to scarce-resource languages, such as German, Spanish, French, etc. However, for the scarce-resource languages, there is little or no reliable training data, which restricts the performance of machine learning models when performing the NLU tasks for the scarce-resource languages. For a specific NLU task, training data in a scarce-resource language may be augmented with training data in a rich-resource language. Herein, a rich-resource language may be referred to as a source language, and a scarce-resource language may be referred to as a target language. Training data may also be referred to as a training data set herein, which may be composed of multiple training samples. A training sample may refer to a single training instance included in a training data set. A training sample in a target language for a specific NLU task may be synthesized through many ways, thereby augmenting a training data set in the target language for the NLU task. For example, a text in a training sample in a source language may be translated into a text in a target language through a machine translation technology, and a label in the training sample in the source language may be mapped to a label on the target language side through an alignment technology, thereby a training sample in the target language may be obtained. This approach for synthesizing a training sample may be referred to as a translation approach. Alternatively, training samples in a target language may be generated through a large-scale neural network, e.g., a generative adversarial network, a variational autoencoder, a pre-trained language model, etc. This approach for synthesizing training samples may be referred to as a generation approach. However, the training samples synthesized either through the translation approach or the generation approach often contain wrong or inaccurate labels, which leads to poor quality of the synthesized training samples. A wrong or inaccurate label in a training sample may be considered as noise in the training sample. A training sample that contains a wrong or inaccurate label may be considered as a noisy training sample.

The quality of the synthesized training samples may be improved through several methods. Improving the quality of the training samples may also be considered as denoising the training samples. However, these methods only consider training samples synthesized through a single approach, that is, either only consider training samples synthesized through the translation approach, or only consider training samples synthesized through the generation approach. For example, label alignment and recognition between a target language and a source language may be achieved with an attention mechanism, thereby improving the quality of the training samples in the translated target language. This method only considers training samples synthesized through the translation approach. In addition, before training samples in a target language are generated through a language model, the language model may be optimized with a training data set in the target language obtained through a machine translation technology to improve the ability of the language model to generate training samples, thereby improving the quality of the generated training samples in the target language. This method only considers training samples synthesized through the generation approach.

Embodiments of the present disclosure propose to denoise a set of training samples through multiple models, and the set of denoised training samples may be used to train these multiple models, and the trained multiple models may be further used to perform a NLU task corresponding to the set of training samples. Since the denoising and training process of the embodiments of the present disclosure is performed jointly through multiple models, this method may also be referred to as a multi-model joint denoising training method.

In an aspect, the embodiments of the present disclosure propose a series of mechanisms for denoising a set of training samples, which may be executed during training of models. The denoising mechanisms according to the embodiments of the present disclosure may include, e.g., a co-training mechanism for selecting training samples for a current model from a set of training samples through other models in multiple models, a weight determining mechanism for determining a weight of a training sample for calculating a training loss through multiple models, and a label updating mechanism for updating a label of a training sample through multiple models, etc. The mechanisms described above may effectively improve the quality of training samples, and further improve the performance of multiple models trained with such training samples.

In another aspect, the various denoising mechanisms proposed in the embodiments of the present disclosure may be suitable for training samples synthesized through a variety of approaches, e.g., training samples synthesized through a translation approach, training samples synthesized through a generation approach, etc. Herein, a training sample in a source language and containing a reliable label may be referred to as a source training sample. In addition, a training sample synthesized through the translation approach may be referred to as a translated training sample, and a training sample synthesized through the generation approach may be referred to as a generated training sample. The various denoising mechanisms proposed in the embodiments of the present disclosure may be suitable for denoising a set of training samples including source training samples, translated training samples, and generated training samples, etc. A set of denoised training samples may be used to jointly train multiple models. Training a model with a training data set including a variety of training samples may facilitate to train a more robust model.

In another aspect, the various denoising mechanisms proposed in the embodiments of the present disclosure may be suitable not only for a set of cross-language training samples, but also a set of single-language training samples. A set of training samples formed from training samples in different languages may be referred to as a set of cross-language training samples, and a set of training samples formed from training samples in a same language may be referred to as a set of single-language training samples. For example, for a certain NLU task, the number of training samples in the source language may also be insufficient. In this case, the training samples in the source language for the NLU task may also be synthesized through the translation approach or the generation approach, e.g., translated training samples in the source language, generated training samples in the source language, etc. The various denoising mechanisms according to the embodiments of the present disclosure may be suitable for denoising a set of single-language training samples including source training samples, translated training samples in the source language, generated training samples in the source language, etc. It should be appreciated that although the foregoing discussion and the following discussion may involve examples of denoising a set of cross-language training samples, the embodiments of the present disclosure are not limited thereto, but a set of single-language training samples may be denoised in a similar way.

Figure 1:
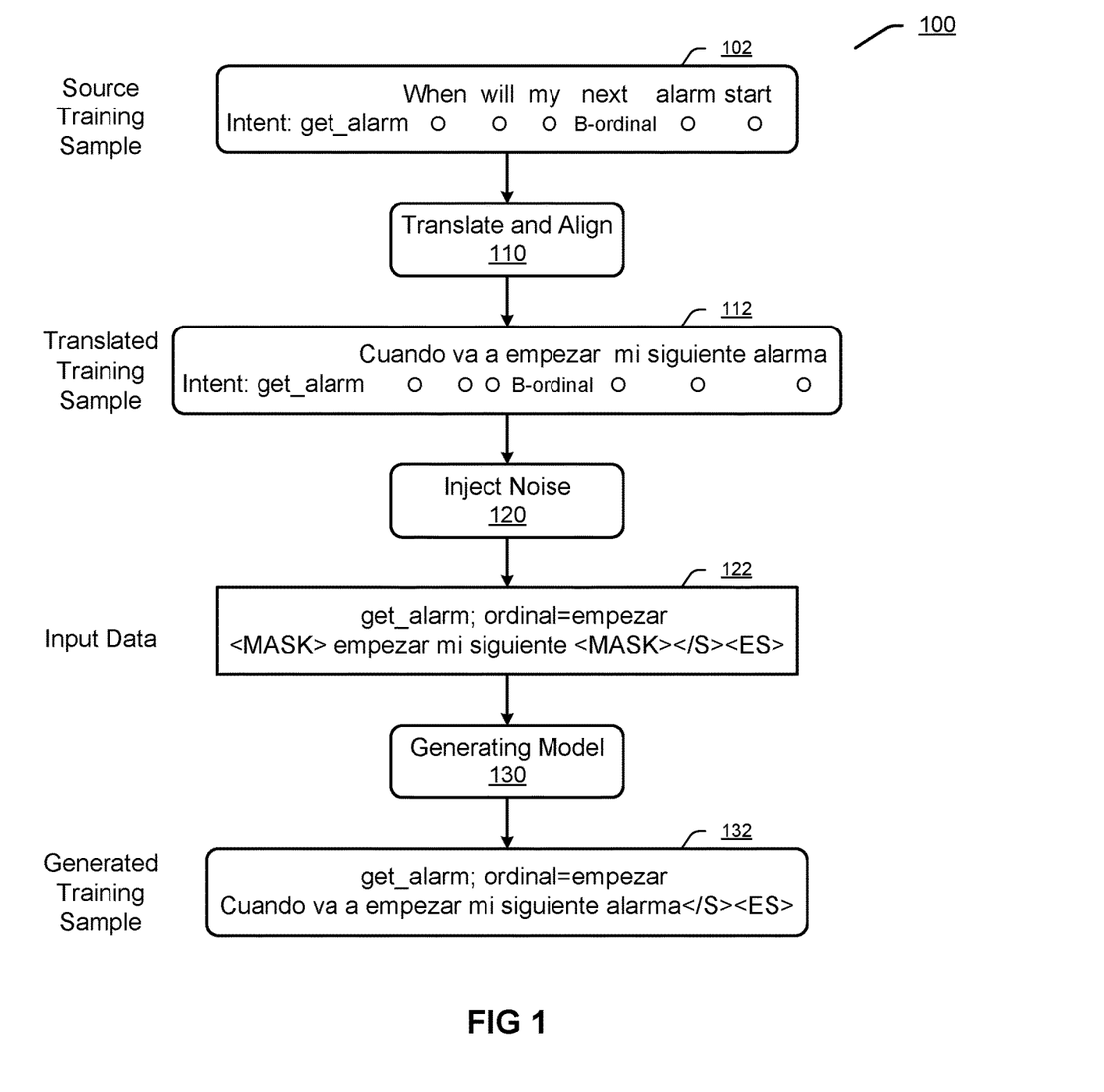
FIG. 1 illustrates an exemplary process for synthesizing a translated training sample and a generated training sample according to an embodiment of the present disclosure.

FIG. 1 illustrates an exemplary process 100 for synthesizing a translated training sample and a generated training sample according to an embodiment of the present disclosure. In the process 100, a translated training sample and a generated training sample in a target language may be synthesized through a source training samples. In the following, the process 100 is described through an example in which a source language is English and a target language is Spanish.

A source training sample 102 may be e.g., a training sample for a SLU task. The SLU is a key part of a task-oriented conversation system, which aims to parse user utterances into predefined semantic representations, e.g., intent, slot-value pair, etc. Therefore, a training sample for the SLU task may include an utterance and a corresponding intent label and slot-value pair label. For example, the source training sample 102 may include an utterance "When will my next alarm start" and an intent label "get_alarm". In addition, a token "next" in the utterance is labeled as "B-ordinal", which may indicate that a slot type of a text segment in which the token "next" is located is "ordinal", wherein "B-" indicates that the token "next" is at the beginning of the text segment. Correspondingly, the slot-value pair label corresponding to the utterance in the source training sample 102 may be "ordinal=next", wherein the slot type is "ordinal", and a value corresponding to the slot type "ordinal" is the token "next".

At 110, the source training samples 102 may be translated into a translated training sample 112 through the operations of translation, alignment, etc. In an implementation, a text in the source training sample may be translated into a text in the target language through a known machine translation technology, and labels in the source training sample may be mapped to labels on the target language side through a known alignment technology, e.g., attention weight, fast-align, GIZA++, etc., thereby a translated training sample in the target language may be obtained. A translated training sample X corresponding to an utterance x may be defined through the following formula:

$$X=[I;(s_1,v_1),\ldots,(s_p,v_p);(x_1,\ldots x_L)] \quad (1)$$

wherein I is an intent label, $(s_i, v_i)_{i=1}^P$ is a slot-value pair label, and $(x_1, \ldots x_L)$ is a token sequence of the utterance x, wherein $s_i$ is a slot type, $v_i$ is a value corresponding to the slot type $s_i$, and $v_i$ is a token in an utterance in the target language, which may be obtained through aligning tokens between the utterance in the source language and the utterance in the target language.

For example, the utterance "When will my next alarm start" in the source training sample 102 may be translated into an utterance "Cuando va a empezar mi siguiente alarma" in Spanish through a known machine translation technology, and the labels in the source training sample 102, i.e., the intent label "get_alarm" and the slot-value pair label "ordinal=next", may be mapped to labels on the Spanish side, e.g., an intent label "get_alarm" and a slot-value pair label "ordinal=empezar". The utterance "Cuando va a empezar mi siguiente alarma", the intent label "get_alarm" and the slot-value pair label "ordinal=empezar" may form the translated training sample 112.

In order to further enhance the diversity of training samples in the target language, additional training samples in the target language may be synthesized through a generation approach. For example, a generated training sample in the target language may be generated based on a translated training sample in the target language. In an implementation, a training sample in the target language may be generated through a pre-trained generating model. Preferably, before generating a training sample with a generating model, the generating model may be optimized, e.g., fine-tuned. For example, the generating model may be optimized with a set of translated training samples, e.g., a set of translated training samples obtained through the process described above. The translated training samples used to optimize the generating model may be defined as the above formula (1). Preferably, when the generating model is optimized with the translated training samples, noise may be injected into the translated training samples through applying text infilling to the translated training samples. For example, for each translated training sample, e.g., 35% of words in the translated training sample may be masked through randomly sampling a segment length according to the Poisson distribution.

The optimized generating model may generate a generated training sample in the target language based on a translated training sample in the target language. Similar to optimizing the generating model, when the training sample is generated through the generating model, noise may be injected into the translated training sample through applying text infilling to the translated training sample. The translated training sample injected with noise may be provided as input data to the generating model to generate a generated training sample in the target language. For example, at 120, noise may be injected into the translated training sample 112 through applying text infilling, to obtain input data 122. The input data 122 may include an intent label "get_alarm", a slot-value pair label "ordinal=empezar", and a token sequence "<MASK> empezar mi siguiente <MASK></S><ES>", wherein "<MASK>" replaces a masked token, "</S>" is a sentence ending token, and "<ES>" is a corresponding language identifier symbol.

The input data 122 may be provided to a generating model 130. The generating model 130 may be, e.g., a model obtained through performing the optimizing process described above on a pre-trained language model such as a multilingual Bidirectional and Auto-Regressive Transformers (mBART). The generating model 130 may generate multiple candidate generated training samples in Spanish based on the input data 122. For example, a generated training sample 132 may include an intent label "get_alarm", a slot-value pair label "ordinal=empezar", and an utterance "Cuando va a empezar mi siguiente </S><ES>". Training samples that do not contain accurate labels may be filtered out from the generated multiple candidate generated training samples. For example, training samples that do not contain the intent label "get_alarm" and/or the slot-value pair label "ordinal=empezar" included in the input data 122 may be filtered out from the multiple candidate generated training samples.

It should be appreciated that the process 100 in FIG. 1 is only an example of a process for synthesizing a translated training sample and a generated training sample. According to actual application requirements, the process for synthesizing the translated training sample and the generated training sample may comprise any other steps, and may comprise more or fewer steps. In addition, although the training samples in the target language are synthesized in the process 100 through the translation approach and the generation approach, in the case where training samples in the source language are insufficient, the training samples in the source language may be synthesized through a similar process. For example, the training samples in the source language may be translated into training samples in other languages, and then the training samples in other languages may be back-translated to the training samples in the source language. Since different representations will be produced during the translation process, different training samples in the source language may be constructed. In addition, a small amount of training samples in the source language may be provided to a generating model. The generating model may generate additional training samples in the source language.

Figure 2:
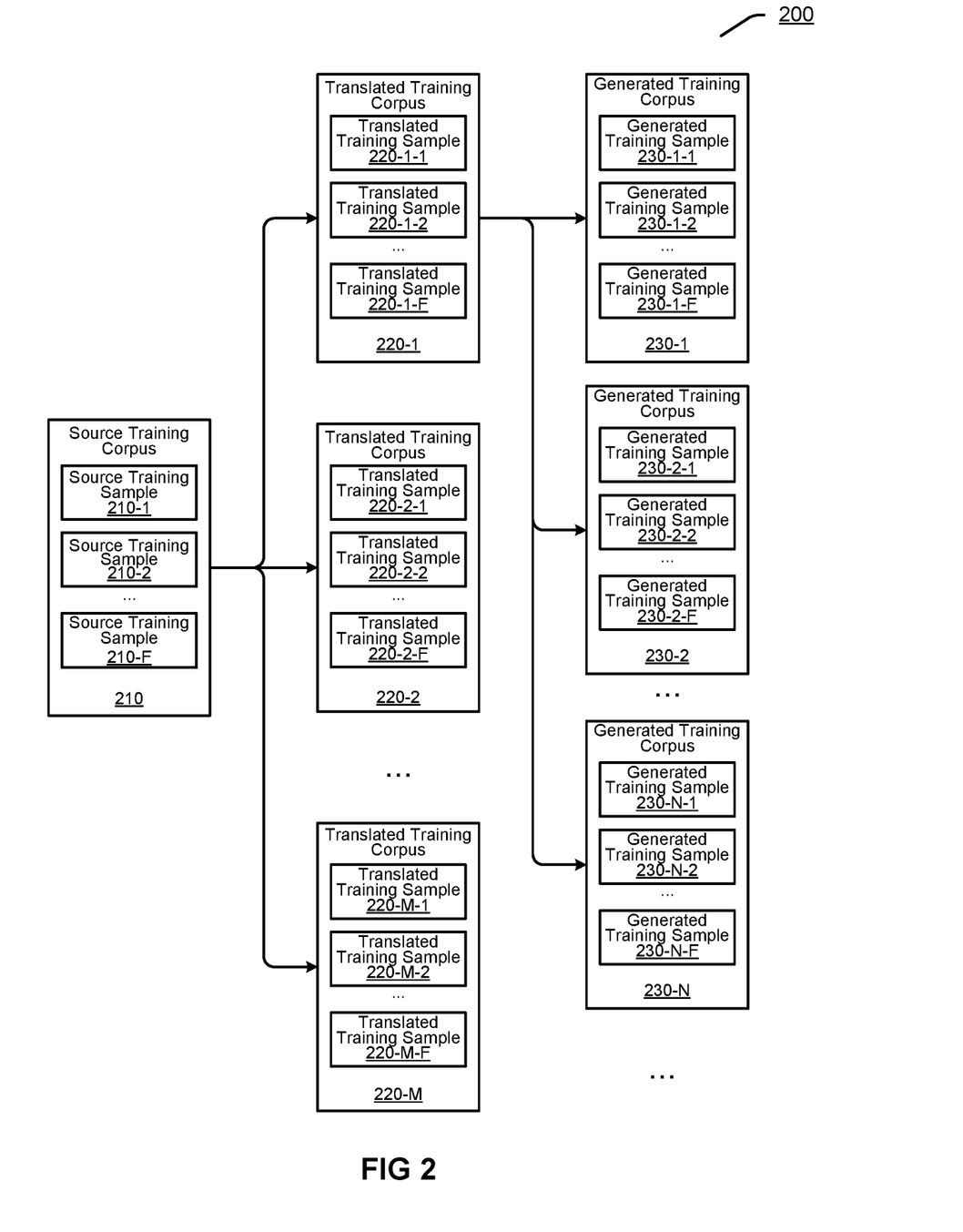
FIG. 2 illustrates an exemplary process for obtaining multiple training corpora according to an embodiment of the present disclosure.

Through the process 100, the translated training sample and the generated training sample are synthesized. The synthesized translated training sample and generated training sample may be used to construct a translated training corpus and a generated training corpus, respectively. Herein, a training corpus constructed through a set of translated training samples may be referred to as a translated training corpus, and a training corpus constructed through a set of generated training samples may be referred to as a generated training corpus. FIG. 2 illustrates an exemplary process 200 for obtaining multiple training corpora according to an embodiment of the present disclosure. In the process 200, at least one translated training corpus and at least one generated training corpus may be obtained through a source training corpus. Herein, a corpus that includes a set of source training samples may be referred to as a source training corpus.

The source training corpus 210 may include a set of source training samples 210-1 to 210-F (F≥1). Each source training sample 210-$f$ (1≤f≤F) may be translated into a translated training sample in a corresponding target language. For example, the source training samples may be translated into a translated training sample through the translation and alignment operation 110 in FIG. 1.

For each source training sample, multiple machine translation technologies or multiple alignment technologies may be employed, and accordingly, multiple translated training samples corresponding to the source training sample may be obtained. A set of translated training samples for the source training corpus 210 obtained through employing the same machine translation technology and the same alignment technology may be combined into one translated training corpus. As an example, M translated training corpus 220-1 to 220-M (M≥1) may be obtained, and each translated training corpus 220-$m$ (1≤m≤M) may correspond to e.g., a specific machine translation technology and alignment technology. In addition, a set of translated training samples 220-$m$-1 to 220-$m$-F included in the translated training corpus 220-$m$ may correspond to a set of source training samples 210-1 to 210-F, respectively.

In addition, for each translated training corpus 220-$m$ in the set of translated training corpus 220-1 to 220-M, a set of generated training corpora may be generated based on the translated training corpus. For example, a set of generated training corpora 230-1 to 230-N (N≥1) may be generated based on the translated training corpus 220-1. For each translated training sample, a generated training sample corresponding to the translated training sample may be generated through a generating model. For example, a generated training sample corresponding to the translated training sample may be generated through the noise injection operation 120 and the generating model 130 in FIG. 1.

For each translated training sample, multiple generating models may be employed, and accordingly, multiple generated training samples corresponding to the translated training sample may be obtained. A set of translated training samples for the same translated training corpus obtained through employing a generating model may be combined into a generated training corpus. As an example, for the translated training corpus 220-1, N generated training corpora 230-1 to 230-N (N≥1) may be obtained, and each generated training corpus 230-$n$ (1≤n≤N) may, e.g., correspond to a specific generating model. In addition, a set of generated training samples 230-$n$-1 to 230-$n$-F included in the generated training corpus 230-$n$ may correspond to a set of translated training samples 220-1-1 to 220-1-F, respectively.

It should be appreciated that the process 200 in FIG. 2 is only an example of a process for obtaining multiple training corpora. According to actual application requirements, the process for obtaining multiple training corpora may include any other steps, and may include more or fewer steps. In addition, although in process 200, for the sake of brevity, a translated training sample in a translated training corpus and a generated training sample in a generated training corpus have a one-to-one correspondence with a source training sample in a source training corpus, i.e., a source training sample may be translated into a translated training sample with a specific translation technology and a specific alignment technology, and a specific generating model may generate a generated training sample based on a translated training sample, but the embodiments of the present disclosure are not limited thereto. According to actual application requirements, a source training sample may also be translated into multiple translated training samples with a specific translation technology and a specific alignment technology. In addition, a specific generating model may generate multiple generated training samples based on a translated training sample. For example, as described above in conjunction with FIG. 1, a generating model may generate multiple candidate generated training samples. After training samples that do not contain accurate labels are filtered out from the multiple candidate generated training samples, several training samples may be randomly sampled from the remaining generated training samples to construct a generated training corpus for the generating model. In addition, it should be appreciated that the generating model may also generate one or more generated training samples based on the source training sample. Accordingly, the generated training corpus may be constructed directly from the source training corpus.

In the following, a process for multi-model joint denoising training will be described through taking a SLU task as an example. A training sample for the SLU task may include an utterance and a corresponding intent label and slot-value pair label. For example, an utterance $x=\{x_i\}_{i=1}^L$, wherein L is the length of a token sequence, may have a corresponding intent label $y^I$ and a slot type label sequence $y^s=\{y_i^s\}_{i=1}^L$, wherein $y_i^s$ is a slot type label for the i-th token $x_i$. The utterance x may be provided to an encoder $\mathcal{M}_{enc}$ to obtain a contextual hidden representation H of the utterance x. The processing described above may be expressed through the following formula:

$$H = \mathcal{M}_{enc}(x,\Theta) = \{h_i\}_{i=0}^L \quad (2)$$

wherein $\Theta$ is a parameter of the encoder $\mathcal{M}_{enc}$, $h_0$ is a sentence-level representation for an intent classification of the utterance x, and $h_i$ (1≤i≤L) is a token-level representation for slot filling of the utterance x. An intent probability distribution $p^I(x; \Theta)$ and a slot type probability distribution $p_i^s(x; \Theta)$ of the utterance x may be obtained through applying linear transformation and softmax operation. The processing described above may be expressed through the following formulas:

$$p^I(x;\Theta) = \text{softmax}(W^I \cdot h_0 + b^I) \quad (3)$$

$$p_i^S(x;\Theta) = \text{softmax}(W^S \cdot h_i + b^S) \quad (4)$$

wherein $p^I \in \mathbb{R}^{1 \times |C^I|}$, $p_i^S \in \mathbb{R}^{1 \times |C^S|}$, $C^I$ is an intent label set, $C^S$ is a slot type label set based on a BIO annotation schema, $W^I \in \mathbb{R}^{|C^I| \times d}$ and $W^s \in \mathbb{R}^{|C^s| \times d}$ are output matrices, and $b^I$ and $b^S$ are biases.

Figure 3:
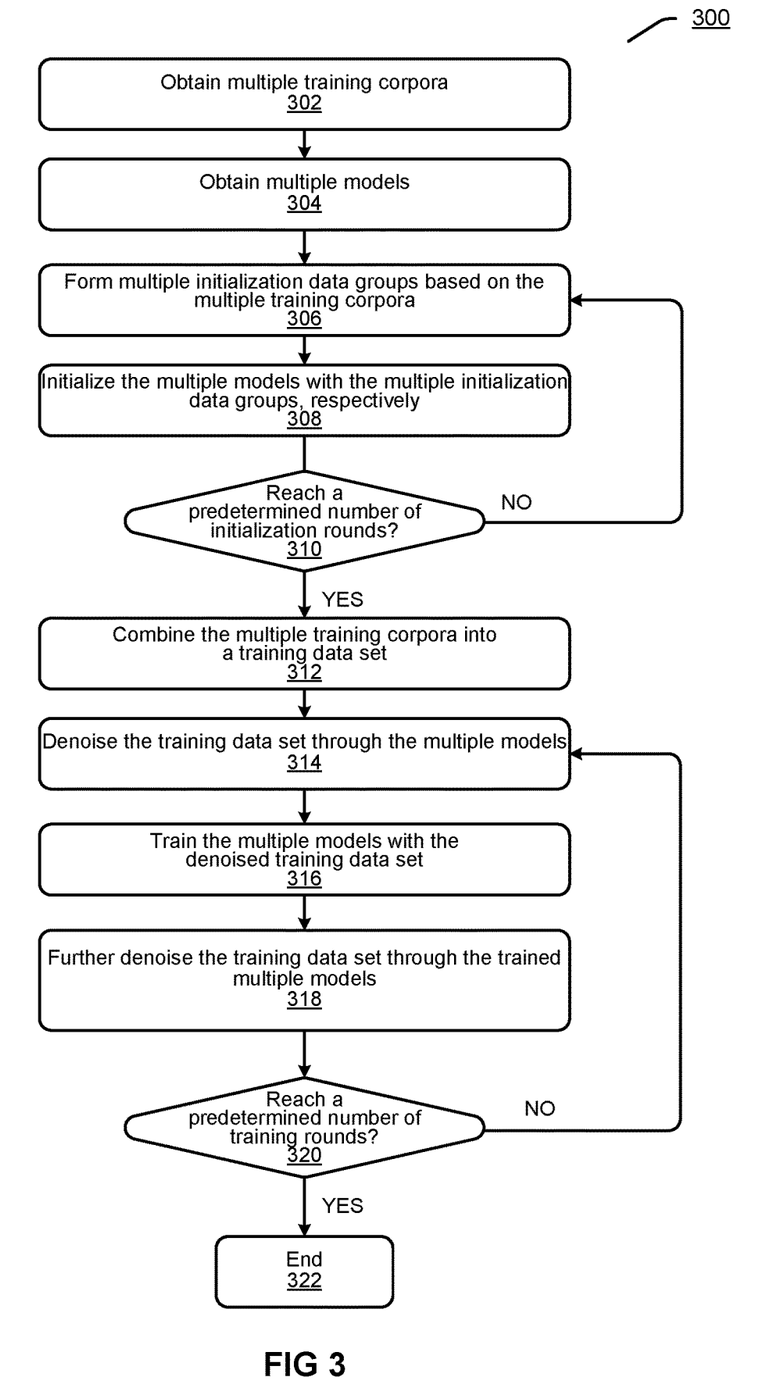
FIG. 3 illustrates an exemplary process for multi-model joint denoising training according to an embodiment of the present disclosure.

FIG. 3 illustrates an exemplary process 300 for multi-model joint denoising training according to an embodiment of the present disclosure. In the process 300, multiple models may be initialized, a set of training samples may be jointly denoised through the initialized multiple models, and these multiple models may be jointly trained with a set of denoised training samples.

At 302, multiple training corpora may be obtained. For example, two or more of a source training corpus, at least one translated training corpus, at least one generated training corpus may be obtained. Training samples in the multiple training corpora may be based on a same language or different languages. The multiple training corpora may be obtained, e.g., through the process 200 in FIG. 2.

At 304, multiple models may be obtained. For example, K (K≥1) models $\{\mathcal{M}_1, \mathcal{M}_2, \ldots, \mathcal{M}_K\}$ may be obtained. The multiple models may be multiple models with the same structure used to perform a specific NLU task.

Preferably, before denoising a set of training samples through the multiple models, the multiple models may be preliminarily trained. Herein, this preliminary training process may also be referred to as an initialization process. At 306, a plurality of initialization data groups may be formed based on the multiple training corpora. Herein, training data used to initialize a model may be referred to as an initialization data group. For example, multiple initialization data groups may be formed based on the source training corpus, at least one translated training corpus, and at least one generated training corpus obtained at 302. The number of initialization data groups may be consistent with the number of models. For example, in the case of two models, i.e., a model $\mathcal{M}_1$ and a model $\mathcal{M}_2$, two initialization data groups may be formed based on the multiple training corpora. In addition, preferably, since the source training corpus is a training corpus containing reliable labels, the source training corpus may be included in each initialization data group. That is, each initialization data group may include at least the source training corpus. As an example, an initialization data group $\mathcal{D}_1=\{\mathcal{D}_{src}, \mathcal{D}_{trans}\}$, an initialization data group $\mathcal{D}_2=\{\mathcal{D}_{src}, \mathcal{D}_{trans}, \mathcal{D}_{gen}\}$, etc. may be formed, wherein $\mathcal{D}_{src}$ may be a source training corpus, $\mathcal{D}_{trans}$ may be one of the at least one translated training corpus, and $\mathcal{D}_{gen}$ may be one of the at least one generated training corpus. In the case of multiple translated training corpora or multiple generated training corpora, different translated training corpora or different generated training corpora may be used to form multiple different initialization data groups.

At 308, the multiple models may be initialized with the multiple initialization data groups, respectively. For example, a model $\mathcal{M}_k$ may be initialized with a initialization data group $\mathcal{D}_k$ ($k \leq K$). As an example, the model $\mathcal{M}_1$ may be initialized with the initialization data group $\mathcal{D}_1=\{\mathcal{D}_{src}, \mathcal{D}_{trans}\}$, and the model $\mathcal{M}_2$ may be initialized with the initialization data group $\mathcal{D}_2=\{\mathcal{D}_{src}, \mathcal{D}_{trans}, \mathcal{D}_{gen}\}$. Assume that each training corpus is a training corpus for the SLU task. In an implementation, the model $\mathcal{M}_k$ may be initialized through minimizing a cross-entropy loss as shown in the following formula:

$$L^k(x) = \frac{1}{L}\sum_{i=1}^{L} y_i^S p_i^S(x; \Theta_k) + y^I \log p^I(x; \Theta_k) \quad (5)$$

wherein x is an utterance in a training sample, $y^I$ is an intent label of the utterance x, $y_i^S$ is a slot type label of the i-th token in the utterance x, and $p^I(x; \Theta_k)$ and $p_i^S(x; \Theta_k)$ are a predicted probability distribution of the intent and a predicted probability distribution of the slot type obtained through the model $\mathcal{M}_k$, respectively.

Optionally, multiple rounds of initialization may be performed on the multiple models through performing steps 306 and 308 multiple times, respectively. At 310, it may be determined whether a predetermined number of initialization rounds have been reached. If it is determined at 310 that the predetermined number of initialization rounds has not been reached, the process 300 may return to the step 306, at 306, multiple initialization data groups may be re-formed based on the multiple training corpora, and at 308, the multiple models obtained in the previous round may be initialized with the re-formed multiple initialization data groups, respectively. The re-formed multiple initialization data groups may be the same as or different from the multiple initialization data groups formed in the previous round.

If it is determined at 310 that the predetermined number of initialization rounds have been reached, the process 300 may proceed to a step 312, and at 312, the multiple training corpora obtained at 302 may be combined into a training data set. For example, the source training corpus $\mathcal{D}_{src}$, the translated training corpus $\mathcal{D}_{trans}$, and the generated training corpus $\mathcal{D}_{gen}$ may be combined into a training data set $\mathcal{D} = \{\mathcal{D}_{src}, \mathcal{D}_{trans}, \mathcal{D}_{gen}\}$.

Joint denoising training may be performed on the multiple models with the training data set. For example, a set of training samples may be denoised through the multiple models, and the multiple models may be trained with a set of denoised training samples. The set of training samples may be further denoised through the trained multiple models. In an implementation, the entire training data set may be provided to multiple models. In this case, the set of training samples may correspond to the training data set. Steps 314 to 318 in process 300 illustrate an exemplary process employing this implementation.

At the step 314 in the process 300, the training data set may be denoised through the multiple models. For example, for each model in the multiple models, a training sample for the model may be selected from the training data set through other models in the multiple models. Alternatively or additionally, for each training sample in the training data set, a weight of the training sample for calculating a training loss may be determined through the multiple models. An exemplary process for selecting training samples and determining weights will be described later in conjunction with FIG. 5.

At 316, the multiple models may be trained with the denoised training data set. For example, for each model in the multiple models, the model may be trained with the training samples selected at 314. For example, for each training sample in the selected training samples, the weight determined at 314 for calculating the training loss of the training sample may be applied to model training. An exemplary process for training the multiple models will be described later in conjunction with FIG. 5.

At 318, the training data set may be further denoised through the trained multiple models. For example, labels of one or more training samples in the training data set may be updated through the trained multiple models. The updated labels may be used in the next round of denoising and training process. An exemplary process for further denoising the training data set will be described later in conjunction with FIG. 5.

According to an embodiment of the present disclosure, optionally, multiple rounds of joint denoising training may be performed on the multiple models through performing the steps 314 to 318 multiple times. At 320, it may be determined whether a predetermined number of training rounds have been reached. If it is determined at 320 that the predetermined number of training rounds has not been reached, the process 300 may return to the step 314 and perform the steps 314 to 318 again. If it is determined at 320 that the predetermined number of training rounds have been reached, the process 300 may proceed to a step 322, and at 322, the process 300 may end.

Figure 4:
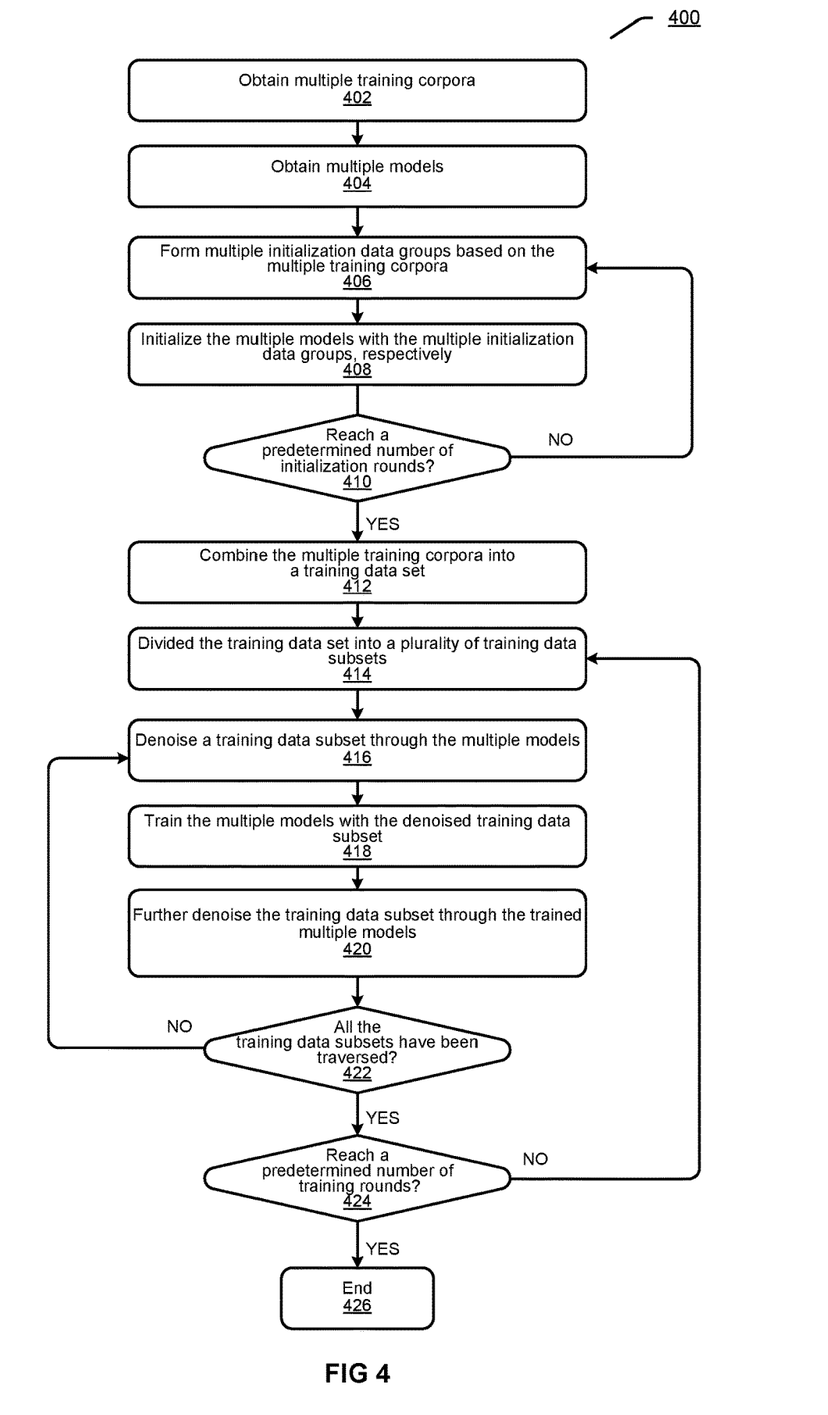
FIG. 4 illustrates another exemplary process for multi-model joint denoising training according to an embodiment of the present disclosure.

FIG. 4 illustrates another exemplary process 400 for multi-model joint denoising training according to an embodiment of the present disclosure. Steps 402 to 412 in the process 400 may correspond to the steps 302 to 312 in the process 300 in FIG. 3, respectively. Through the steps 402 to 412, multiple models may be initialized, and a training data set based on the combination of multiple training corpora may be obtained. Joint denoising training may be performed on the multiple models with the training data set. For example, a set of training samples may be denoised through the multiple models, and the multiple models may be trained with a set of denoised training samples. In an implementation, the training data set may be divided into a plurality of training data subsets. In this case, a set of training samples may correspond to a training data subset among the plurality of training data subsets in the training data set, and the plurality of training data subsets may be used for performing the denoising and training process iteratively.

At 414, the training data set may be divided into a plurality of training data subsets.

The denoising and training process may be performed iteratively for the plurality of training data subsets in the training data set. In each iteration, a training data subset may be denoised through the multiple models, and the multiple models may be trained with the denoised training data subset.

At 416, a training data subset may be denoised through the multiple models. For example, for each model in the multiple models, training samples for the model may be selected from the training data subset through other models in the multiple models. Alternatively or additionally, for each training sample in the training data subset, a weight of the training sample for calculating a training loss may be determined through the multiple models. An exemplary process for selecting training samples and determining weights will be described later in conjunction with FIG. 5.

At 418, the multiple models may be trained with the denoised training data subset. For example, for each model in the multiple models, the model may be trained with the training samples selected at 416. For example, for each training sample in the selected training samples, the weight determined at 416 for calculating the training loss of the training sample may be applied to model training. An exemplary process for training the multiple models will be described later in conjunction with FIG. 5.

At 420, the training data subset may be further denoised through the trained multiple models. For example, labels of one or more training samples in the training data subset may be updated through the trained multiple models. The updated labels may be used in the next round of denoising and training process. An exemplary process for further denoising the training data subset will be described later in conjunction with FIG. 5.

Optionally, the steps 416 to 420 may be performed iteratively for the plurality of training data subsets in the training data set. At 422, it may be determined whether all the training data subsets in the training data set have been traversed. If it is determined at 422 that not all the training data subsets in the training data set have been traversed, the process 400 returns to the step 416, and the steps 416 to 420 are executed for the next training data subset. If it is determined at 422 that all the training data subsets in the training data set have been traversed, the process 400 may proceed to a step 424.

According to an embodiment of the present disclosure, optionally, multiple rounds of joint denoising training may be performed on the multiple models through performing the steps 414 to 422 multiple times. At 424, it may be determined whether a predetermined number of training rounds have been reached. If it is determined at 424 that the predetermined number of training rounds has not been reached, the process 400 may return to the step 414 and perform the steps 414 to 422 again. In this case, at 414, the training data set may be re-divided into a plurality of training data subsets, and the denoising and training process at the steps 416 to 420 may be iteratively executed again based on the re-divided a plurality of training data subsets.

If it is determined at 424 that the predetermined number of training rounds have been reached, the process 400 may proceed to a step 426, and at 426, the process 400 may end.

Through the process 300 in FIG. 3 or the process 400 in FIG. 4, denoising training may be performed on the multiple models. The multiple models on which denoising training is performed may be used to perform the same NLU task as the NLU task that the training data set is for. In an implementation, one model may be selected from the multiple models to perform the NLU task. In another implementation, these multiple models may be combined into a model set to perform the NLU task. For example, multiple prediction results obtained by the multiple models based on input data may be obtained, and the prediction result that occurred most times may be selected as the final prediction result for the input data.

It should be appreciated that the process 300 in FIG. 3 and the process 400 in FIG. 4 are only examples of a process for multi-model joint denoising training. According to actual application requirements, the process for multi-model joint denoising training may include any other steps, and may include more or fewer steps. For example, the process of initializing multiple models may be omitted from the process 300 or 400, so that a set of training samples may be denoised directly through the multiple models. In addition, it should be appreciated that although the foregoing discussion and the following discussion may involve denoising training samples for the SLU task, and accordingly, the multiple models trained with such training samples may be used to perform the SLU task, the embodiments of the present disclosure are not limited thereto, but may denoise training samples for other NLU tasks, e.g., a MRC tasks, a QA task, etc., in a similar manner, and the trained multiple models may be used for corresponding other NLU tasks.

Figure 5:
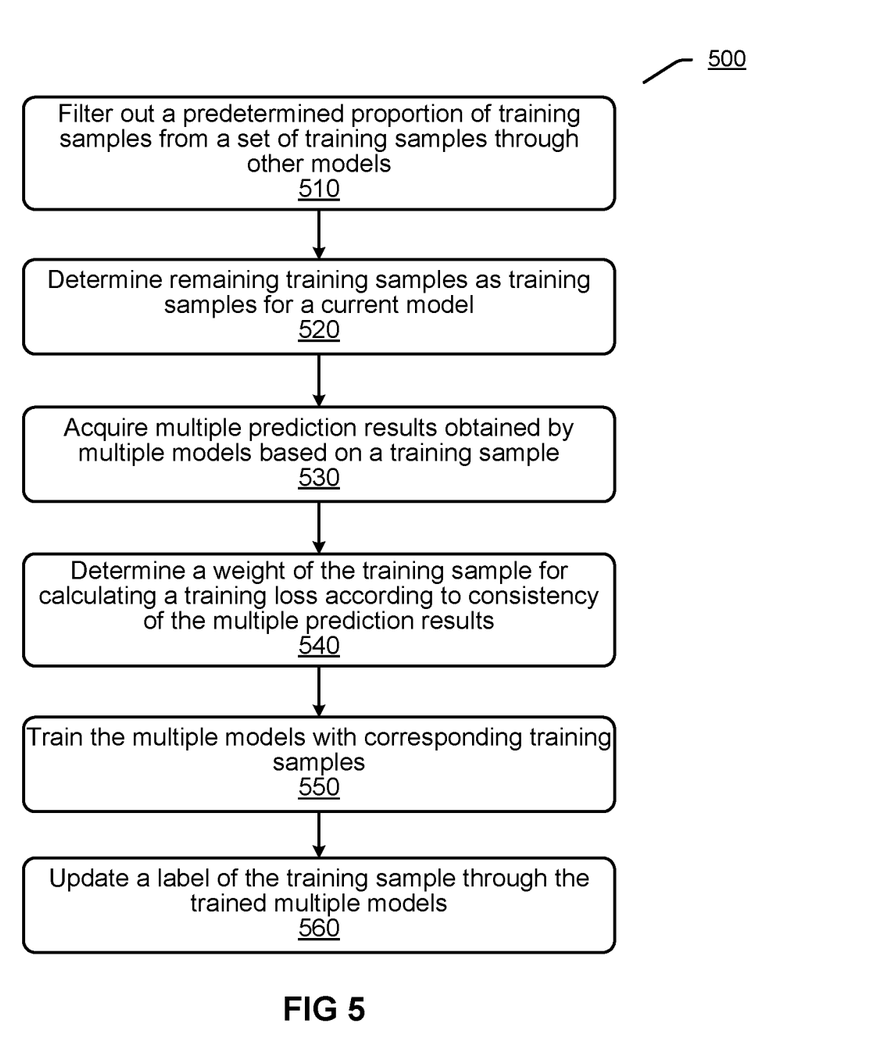
FIG. 5 illustrates an exemplary process for performing denoising and training according to an embodiment of the present disclosure.

FIG. 5 illustrates an exemplary process 500 for performing denoising and training according to an embodiment of the present disclosure. In process 500, a set of training samples may be denoised through multiple models, and the multiple models may be trained with a set of denoised training samples. The process 500 may correspond to the steps 314 to 318 in FIG. 3 or the steps 416 to 420 in FIG. 4. In the case where the process 500 corresponds to the steps 314 to 318 in FIG. 3, the process 500 may be performed with a training data set, i.e., a set of training samples in the process 500 may correspond to a training data set. In the case where the process 500 corresponds to the steps 416 to 420 in FIG. 4, the process 500 may be performed with a training data subset of a plurality of training data subsets in the training data set, i.e., a set of training samples in the process 500 may correspond to a training data subset.

First, for each model in the multiple models, preferably, training samples for the model may be selected from a set of training samples through other models in the multiple models. Noise in a training corpus obtained through one approach is usually independent of noise in the training corpus obtained through another approach. For example, noise in the training corpus obtained through a translation approach is usually independent of noise in the training corpus obtained through a generation approach. In addition, as described above in conjunction with FIG. 3 or FIG. 4, multiple initialization data groups may be formed based on multiple training corpora, and the multiple models may be initialized with the multiple initialization data groups, respectively. Through the initialization process, each model may acquire corresponding knowledge from corresponding training corpora, and thus may obtain accurate prediction results when predicting based on corresponding training samples. Training corpora contained in the multiple initialization training data groups used to initialize the multiple models are different from each other, thus the multiple initialized models may have better performance on different training corpora. For example, assuming that a model $\mathcal{M}_1$ is initialized with an initialization training data group $\mathcal{D}_1 = \{\mathcal{D}_{src}, \mathcal{D}_{trans}\}$, the model $\mathcal{M}_1$ may obtain accurate prediction results when predicting based on training samples in a source training corpus $\mathcal{D}_{src}$ or a translated training corpus $\mathcal{D}_{trans}$; while a model $\mathcal{M}_2$ is initialized with an initialization training data group $\mathcal{D}_2 = \mathcal{D}\{_{src}, \mathcal{D}_{trans}, \mathcal{D}_{gen}\}$, the model $\mathcal{M}_2$ may obtain accurate prediction results when predicting based on training samples in the source training corpus $\mathcal{D}_{src}$, the translated training corpus $\mathcal{D}_{trans}$ or a generated training corpus $\mathcal{D}_{gen}$. Each model may predict based on each training sample in a set of training samples. Training samples with more accurate prediction results may be provided to other models.

For example, at 510, for one model of multiple models, a predetermined proportion of training samples may be filtered out from a set of training samples through other models, and at 520, remaining training samples in the set of training samples may be determined as training samples for the model. Generally speaking, a training sample with a smaller prediction loss may have a more accurate label. Therefore, for this model, a predetermined proportion of training samples with larger prediction losses may be filtered out from the set of training samples, the larger prediction losses being obtained from other models. The training sample selection process for the model $\mathcal{M}_k$ may be expressed e.g., by the following formula:

$$\mathcal{D}'_k = \underset{\mathcal{D}': |\mathcal{D}'| \geq (1-\delta)|\mathcal{D}'|}{\operatorname{argmin}} \sum_{j}^{k \neq k} \mathcal{L}^j(\mathcal{D}') \qquad (6)$$

wherein $\mathcal{D}'$ represents a set of training samples, $\mathcal{D}'_k$ represents training samples for a model $\mathcal{M}_k$ selected from the set of training samples $\mathcal{D}'$, $\delta$ represents a predetermined filtering proportion, and $\mathcal{L}^j(\mathcal{D}')$ represents a prediction loss corresponding to the set of training samples $\mathcal{D}'$ at another model $\mathcal{M}_j$.

Training samples for each model may be selected through the steps 510 and 520. Since the training samples for each model are selected through other models, this mechanism may also be referred to as a co-training mechanism.

After selecting training samples for each model from the set of training samples, preferably, for each training sample in the set of training samples, a weight of the training sample for calculating a training loss may be determined through the multiple models. The embodiments of the present disclosure propose a weight determining mechanism. In an implementation, a weight of a training sample may be determined according to consistency of multiple prediction results obtained by the multiple models based on the training sample. If the multiple prediction results obtained by the multiple models based on the training sample are inconsistent, the training sample is likely to be noisy. For example, at 530, multiple prediction results obtained by the multiple models based on the training sample may be acquired, and at 540, the weight of the training sample for calculating the training loss may be determined according to the consistency of the multiple prediction results. The consistency of the multiple prediction results may be associated with the uncertainty of the multiple prediction results. The lower the consistency of multiple prediction results for a specific training sample, the greater the divergence among the multiple prediction results, the higher the uncertainty, the more likely the training sample is noisy, thus the lower its weight should be.

The uncertainty of a prediction result may be expressed as u, which may be defined, e.g., by the following formula:

$$u = \frac{1}{K} \sum_{k=1}^{K} \operatorname{Var}(p(x; \Theta_k), m(x)) \qquad (7)$$

Wherein $$\operatorname{Var}(p(x; \Theta_k), m(x)) = \left( p^I(x; \Theta_k) - \frac{1}{K} \sum_{k=1}^{K} p^I(x; \Theta_k) \right)^2 + \qquad (8)$$

-continued
$$\frac{1}{L} \sum_{i=1}^{L} \left( p_i^S(x; \Theta_k) - \frac{1}{K} \sum_{k=1}^{K} p_i^S(x; \Theta_k) \right)^2$$

At 550, the multiple models may be trained with corresponding training samples. For example, for each model in the multiple models, the model may be trained with the training samples selected at 510 and 520. For example, for each training sample in the selected training samples, the weight determined at 530 and 540 for calculating the training loss of the training sample may be applied to model training. A training loss corresponding to a training sample including an utterance x for the model $\mathcal{M}_k$ may be calculated through the following formula:

$$L^{k'}(x) = w \left[ \frac{1}{L} \sum_{i=1}^{L} \tilde{y}_i^S p_i^S(x; \Theta_k) + \tilde{y}^I \log p^I(x; \Theta_k) \right] \qquad (9)$$

wherein $w = e^{-u}$, $\tilde{y}^I$ is a current intent label of the utterance x, $\tilde{y}_i^S$ is a current slot type label of the i-th token in the utterance x, and $p^I(x; \Theta_k)$ and $p_i^S(x; \Theta_k)$ are a predicted probability distribution of the intent and a predicted probability distribution of the slot type obtained by the model $\mathcal{M}_k$ based on the utterance x.

For each model, the model may be trained through minimizing a total training loss corresponding to the set of training samples for the model.

After training the multiple models, preferably, the set of training samples may be further denoised through the multiple models. For example, at 560, labels of one or more training samples in the set of training samples may be updated through the trained multiple models. Preferably, since the source training corpus $\mathcal{D}_{src}$ is a training corpus that contains reliable labels, the labels of the training samples from the source training corpus $\mathcal{D}_{src}$ may remain unchanged, and only the training samples from the translated training corpus $\mathcal{D}_{trans}$ and/or generated training corpus $\mathcal{D}_{gen}$ are updated. In an implementation, for each training sample in one or more training samples whose labels are to be updated, multiple prediction results obtained by the multiple trained models based on the training sample may be acquired, and a label of the training sample may be updated based on the multiple prediction results. The above processing may be expressed by the following formula:

$$\tilde{y}^I = \frac{1}{K} \sum_{k=1}^{K} p^I(x; \Theta_k); \tilde{y}_i^S = \frac{1}{K} \sum_{k=1}^{K} p_i^S(x; \Theta_k) \qquad (10)$$

The updated labels may be used in the next round of denoising and training process. In addition, the labels may be updated in a variety of ways, e.g., modifying an intent label of an utterance, modifying a slot type label of a text segment, modifying a BIO boundary of a slot, modifying both the slot type label and the BIO boundary, etc.

The quality of training samples may be effectively improved through the co-training mechanism, the weight determining mechanism, and the label updating mechanism described above, and the performance of the multiple models trained with such training samples may be further improved. It should be appreciated that the process 500 in FIG. 5 is only an example of a process for performing denoising and training. According to the actual application requirements, the process for performing denoising and training may include any other steps, and may include more or fewer steps. For example, although the co-training mechanism, the weight determining mechanism, and the label updating mechanism are employed in the above description, in some embodiments, any one or two of these three mechanisms may be omitted from the process 500. For example, in the case of not performing the co-training mechanism, each model may be trained with all the training samples in a set of training samples. Alternatively, in the case of not performing the weight determining mechanism, all training samples may have the same weight when calculating the training loss. In addition, in the case of not employing the label updating mechanism, each round of denoising and training process may be performed based on the same labels.

Figure 6:
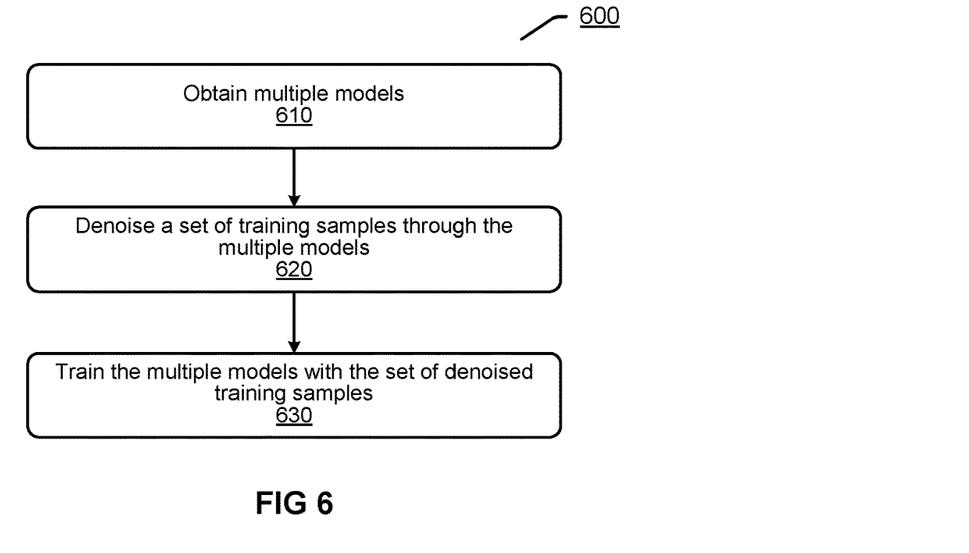
FIG. 6 is a flowchart of an exemplary method for multi-model joint denoising training according to an embodiment of the present disclosure.

FIG. 6 is a flowchart of an exemplary method 600 for multi-model joint denoising training according to an embodiment of the present disclosure.

At 610, multiple models may be obtained.

At 620, a set of training samples may be denoised through the multiple models.

At 630, the multiple models may be trained with the set of denoised training samples.

In an implementation, the set of training samples may come from a training data set. The training data set may include two or more of a source training corpus, at least one translated training corpus, and at least one generated training corpus.

In an implementation, the set of training samples may be based on the same language or different languages.

In an implementation, the method 600 may further comprise initializing the multiple models with multiple initialization data groups. The multiple initialization data groups may be formed by at least one training corpus in a training data set including the set of training samples.

In an implementation, the set of training samples may correspond to a training data set.

In an implementation, the set of training samples may correspond to a training data subset among a plurality of training data subsets in a training data set. The plurality of training data subsets may be used for performing the denoising and the training iteratively.

In each iteration, the denoising may comprise: denoising a training data subset through the multiple models, and the training may comprise: training the multiple models with the denoised training data subset.

In an implementation, the denoising a set of training samples may comprise: for each model in the multiple models, selecting training samples for the model from the set of training samples through other models in the multiple models.

The selecting training samples for the model may comprise: filtering out a predetermined proportion of training samples from the set of training samples through the other models; and determining remaining training samples in the set of training samples as the training samples for the model.

In an implementation, the denoising a set of training samples may comprises: for each training sample in the set of training samples, determining, through the multiple models, a weight of the training sample for calculating a training loss.

The determining a weight of the training sample may comprise: determining the weight according to consistency of multiple prediction results obtained by the multiple models based on the training sample.

In an implementation, the method 600 may further comprise: further denoising the set of training samples through the trained multiple models.

The further denoising the set of training samples may comprise: updating labels of one or more training samples in the set of training samples through the trained multiple models.

The updating labels may comprise, for each training sample in the one or more training samples: acquiring multiple prediction results obtained by the multiple trained models based on the training sample; and updating a label of the training sample based on the multiple prediction results.

The one or more training samples may come from a translated training corpus and/or a generated training corpus.

In an implementation, the set of training samples may correspond to a training data set. The training data set may be used for performing the denoising and the training for multiple rounds.

In an implementation, the set of training samples may come from a training data set. The training data set may be used for performing the denoising and the training for multiple rounds. In each round, the set of training samples may correspond to a training data subset among a plurality of training data subsets in the training data set, and the plurality of training data subsets may be used for performing the denoising and the training iteratively.

It should be appreciated that the method 600 may further comprise any step/process for multi-model joint denoising training according to the embodiments of the present disclosure as described above.

Figure 7:
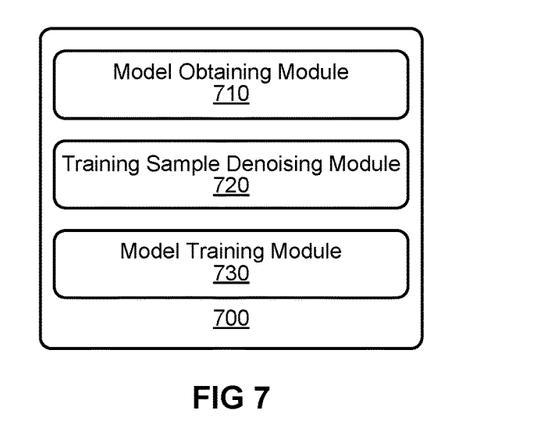
FIG. 7 illustrates an exemplary apparatus for multi-model joint denoising training according to an embodiment of the present disclosure.

FIG. 7 illustrates an exemplary apparatus 700 for multi-model joint denoising training according to an embodiment of the present disclosure.

The apparatus 700 may comprise: a model obtaining module 710, for obtaining multiple models; a training sample denoising module 720, for denoising a set of training samples through the multiple models; and a model training module 730, for training the multiple models with the set of denoised training samples. Moreover, the apparatus 700 may further comprise any other modules configured for multi-model joint denoising training according to the embodiments of the present disclosure as described above.

Figure 8:
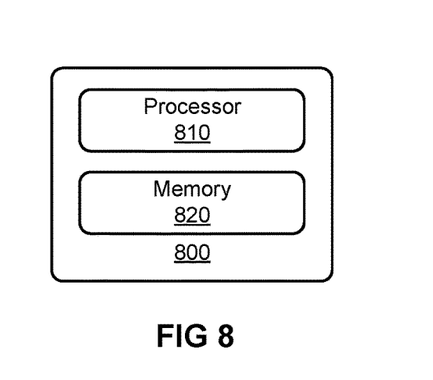
FIG. 8 illustrates an exemplary apparatus for multi-model joint denoising training according to an embodiment of the present disclosure.

FIG. 8 illustrates an exemplary apparatus 800 for multi-model joint denoising training according to an embodiment of the present disclosure. The apparatus 800 may comprise at least one processor 810 and a memory 820 storing computer-executable instructions. The computer-executable instructions, when executed, may cause the at least one processor 810 to: obtain multiple models; denoise a set of training samples through the multiple models; and train the multiple models with the set of denoised training samples.

In an implementation, the computer-executable instructions, when executed, may cause the at least one processor 810 to: initialize the multiple models with multiple initialization data groups, and the multiple initialization data groups are formed by at least one training corpus in a training data set including the set of training samples.

It should be appreciated that the processor 810 may further perform any other steps/processes of methods for multi-model joint denoising training according to the embodiments of the present disclosure as described above.

The embodiments of the present disclosure proposes a computer program product for multi-model joint denoising training, comprising a computer program that is executed by at least one processor for: obtaining multiple models; denoising a set of training samples through the multiple models; and training the multiple models with the set of denoised training samples. In addition, the computer programs may further be performed for implementing any other step/process of methods for multi-model joint denoising training according to the embodiments of the present disclosure as described above.

The embodiments of the present disclosure may be embodied in non-transitory computer-readable medium. The non-transitory computer readable medium may comprise instructions that, when executed, cause one or more processors to perform any operation of methods for multi-model joint denoising training according to the embodiments of the present disclosure as described above.

It should be appreciated that all the operations in the methods described above are merely exemplary, and the present disclosure is not limited to any operations in the methods or sequence orders of these operations, and should cover all other equivalents under the same or similar concepts. In addition, the articles "a" and "an" as used in this description and appended claims, unless otherwise specified or clear from the context that they are for the singular form, should generally be interpreted as meaning "one" or "one or more."

It should also be appreciated that all the modules in the apparatuses described above may be implemented in various approaches. These modules may be implemented as hardware, software, or a combination thereof. Moreover, any of these modules may be further functionally divided into sub-modules or combined together.

Processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in the present disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout the present disclosure. The functions of a processor, any portion of a processor, or any combination of processors presented in this disclosure may be implemented with software executed by a microprocessor, a microcontroller, a DSP, or other suitable platforms.

Software shall be construed broadly to mean instructions, instruction sets, code, code segments, program code, programs, subprograms, software modules, applications, software applications, software packages, routines, subroutines, objects, threads of execution, procedures, functions, etc. The software may reside on a computer-readable medium. A computer-readable medium may include, e.g., memory, the memory may be e.g., a magnetic storage device (e.g., hard disk, floppy disk, magnetic strip), an optical disk, a smart card, a flash memory device, random access memory (RAM), read only memory (ROM), programmable ROM (PROM), erasable PROM (EPROM), electrically erasable PROM (EEPROM), a register, or a removable disk. Although a memory is shown separate from a processor in the various aspects presented throughout the present disclosure, the memory may be internal to the processor, e.g., a cache or register.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein. All structural and functional equivalents to the elements of the various aspects described throughout the present disclosure that are known or later come to be known to those of ordinary skilled in the art are expressly incorporated herein and encompassed by the claims.

The invention claimed is:

1. A method for multi-model joint denoising training, the method comprising:
   obtaining multiple machine learning models having identical neural network architectures, wherein each machine learning model is initialized with a different combination of training corpora selected from a source training corpus containing reliable labels, at least one translated training corpus generated through machine translation, and at least one generated training corpus created through neural language generation;
   jointly denoising a set of training samples through the multiple models by:
      for each model, selecting a subset of training samples from the set of training samples by filtering out a predetermined proportion of training samples having highest prediction losses as determined by other models in the multiple models, and
      for each training sample, determining a weight for calculating training loss based on consistency of prediction results obtained from the multiple models, wherein inconsistent prediction results indicate noisy training samples;
   training the multiple models simultaneously with their respective selected subsets of denoised training samples using the determined weights; and
   iteratively updating labels of training samples from translated and generated training corpora based on consensus predictions from the trained multiple models.

2. The method of claim 1, wherein the set of training samples comes from a training data set, the training data set including two or two of a source training corpus, at least one translated training corpus, and at least one generated training corpus.

3. The method of claim 1, further comprising:
   initializing the multiple models with multiple initialization data groups, and the multiple initialization data groups are formed by at least one training corpus in a training data set including the set of training samples.

4. The method of claim 1, wherein the denoising a set of training samples comprises:
   for each model in the multiple models, selecting training samples for the model from the set of training samples through other models in the multiple models.

5. The method of claim 4, wherein the selecting training samples for the model comprises:
   filtering out a predetermined proportion of training samples from the set of training samples through the other models; and
   determining remaining training samples in the set of training samples as the training samples for the model.

6. The method of claim 1, wherein the denoising a set of training samples comprises:
   for each training sample in the set of training samples, determining, through the multiple models, a weight of the training sample for calculating a training loss.

7. The method of claim 6, wherein the determining a weight of the training sample comprises:
   determining the weight according to consistency of multiple prediction results obtained by the multiple models based on the training sample.

8. The method of claim 1, further comprising:
further denoising the set of training samples through the trained multiple models.

9. The method of claim 8, wherein the further denoising the set of training samples comprises:
updating labels of one or more training samples in the set of training samples through the trained multiple models.

10. The method of claim 9, wherein the updating labels comprises, for each training sample in the one or more training samples:
acquiring multiple prediction results obtained by the multiple trained models based on the training sample; and
updating a label of the training sample based on the multiple prediction results.

11. The method of claim 9, wherein the one or more training samples come from a translated training corpus and/or a generated training corpus.

12. The method of claim 1, wherein the set of training samples corresponds to a training data set, and the training data set is used for performing the denoising and the training for multiple rounds.

13. The method of claim 1, wherein:
the set of training samples comes from a training data set, and the training data set is used for performing the denoising and the training for multiple rounds, and
in each round, the set of training samples corresponds to a training data subset among a plurality of training data subsets in the training data set, and the plurality of training data subsets are used for performing the denoising and the training iteratively.

14. An apparatus for multi-model joint denoising training, comprising:
at least one processor; and
a memory storing computer-executable instructions that, when executed, cause the at least one processor to:
obtain multiple machine learning models having identical neural network architectures, wherein each machine learning model is initialized with a different combination of training corpora selected from a source training corpus containing reliable labels, at least one translated training corpus generated through machine translation, and at least one generated training corpus created through neural language generation;
jointly denoise a set of training samples through the multiple models by:
for each model, select a subset of training samples from the set of training samples by filtering out a predetermined proportion of training samples having highest prediction losses as determined by other models in the multiple models, and
for each training sample, determine a weight for calculating training loss based on consistency of prediction results obtained from the multiple models, wherein inconsistent prediction results indicate noisy training samples;
train the multiple models simultaneously with their respective selected subsets of denoised training samples using the determined weights; and
iteratively update labels of training samples from translated and generated training corpora based on consensus predictions from the trained multiple models.

15. A computer program product for multi-model joint denoising training, comprising a computer program that is executed by at least one processor for:
obtaining multiple machine learning models having identical neural network architectures, wherein each machine learning model is initialized with a different combination of training corpora selected from a source training corpus containing reliable labels, at least one translated training corpus generated through machine translation, and at least one generated training corpus created through neural language generation;
jointly denoising a set of training samples through the multiple models by:
for each model, selecting a subset of training samples from the set of training samples by filtering out a predetermined proportion of training samples having highest prediction losses as determined by other models in the multiple models, and
for each training sample, determining a weight for calculating training loss based on consistency of prediction results obtained from the multiple models, wherein inconsistent prediction results indicate noisy training samples;
training the multiple models simultaneously with their respective selected subsets of denoised training samples using the determined weights; and
iteratively updating labels of training samples from translated and generated training corpora based on consensus predictions from the trained multiple models.

* * * * *